July 23, 1935.  J. L. WELCH  2,009,243

PISTON

Filed Dec. 7, 1934   2 Sheets-Sheet 1

Inventor

J. L. Welch

By Clarence A. O'Brien
Attorney

July 23, 1935.  J. L. WELCH  2,009,243

PISTON

Filed Dec. 7, 1934   2 Sheets-Sheet 2

Inventor

J. L. Welch

By Clarence A. O'Brien
Attorney

Patented July 23, 1935

2,009,243

UNITED STATES PATENT OFFICE 2,009,243

PISTON

Julius Leslie Welch, Antigo, Wis.

Application December 7, 1934, Serial No. 756,519

1 Claim. (Cl. 309—8)

The present invention relates to new and useful improvements in pistons particularly for internal combustion engines and has for its primary object to provide, in a manner as hereinafter set forth, a piston embodying a novel construction, combination and arrangement of parts through the medium of which "oil pumping" and piston "slap" or "knock" will be substantially eliminated. Other objects of the invention are to provide a piston of the aforementioned character which will be comparatively simple in construction, strong, durable, highly efficient and reliable in use, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:—

Figure 1:
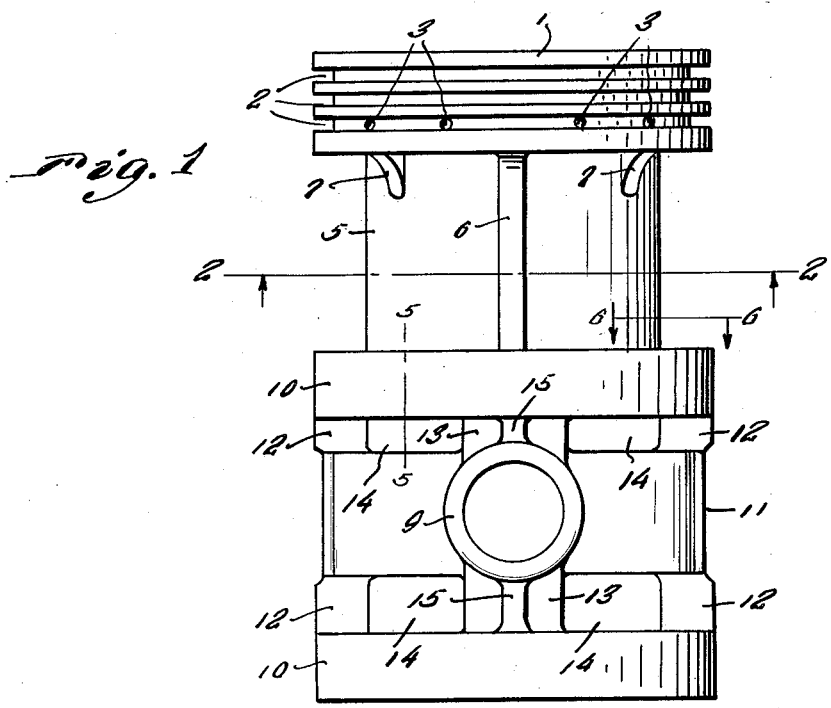
Figure 1 is an elevational view of a piston constructed in accordance with the present invention.
Figure 6:
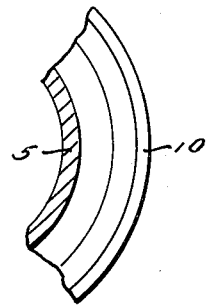
Figure 6 is a fragmentary view in horizontal section, taken substantially on the line 6—6 of Figure 1.
Figure 2:
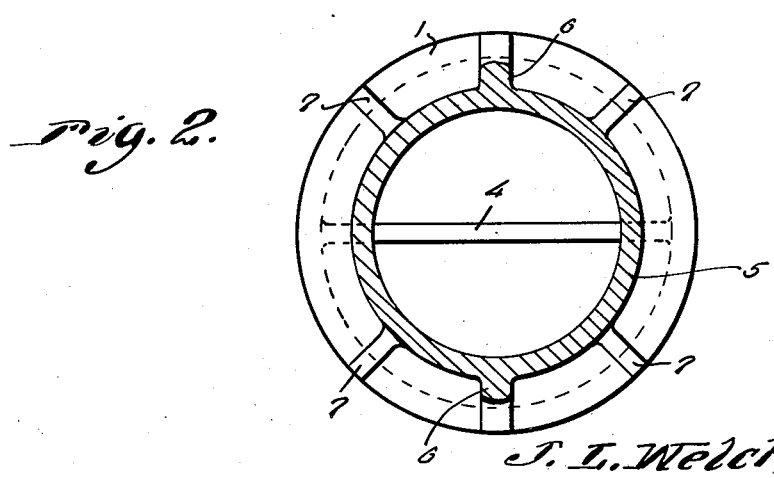
Figure 2 is a horizontal sectional view, taken substantially on the line 2—2 of Figure 1.

Referring now to the drawings in detail, it will be seen that the embodiment of the invention which has been illustrated comprises a head which is designated by the reference numeral 1, said head having a plurality of circumferential grooves 2 therein for the reception of rings (not shown). What is commonly known as an "oil ring" is preferably mounted in the lowermost groove 2 and said lowermost groove has communicating therewith oil drain ports 3, as illustrated to advantage in Figure 1 of the drawings. The interior of the head 1 has formed thereon a diametrically extending reinforcing rib 4.

Figure 3:
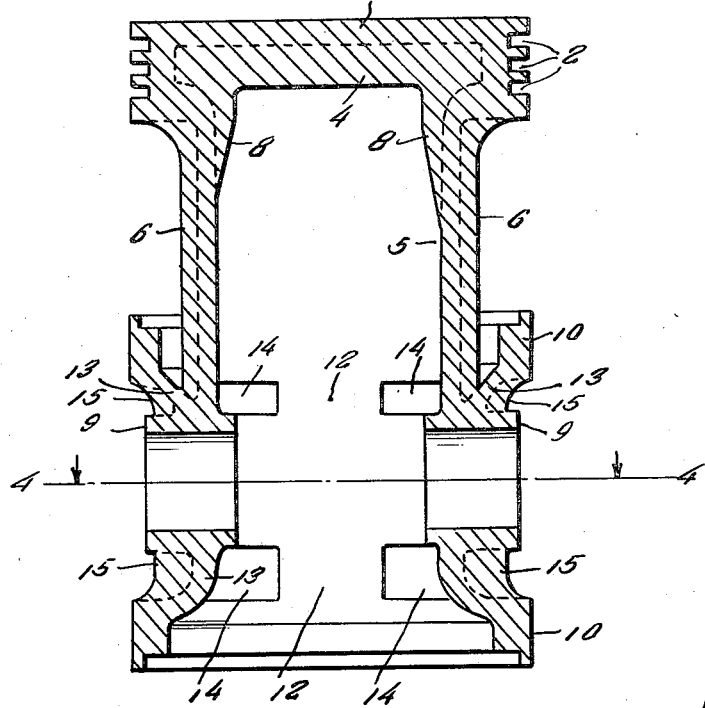
Figure 3 is a view in vertical section through the piston.
Figures 4, 5:
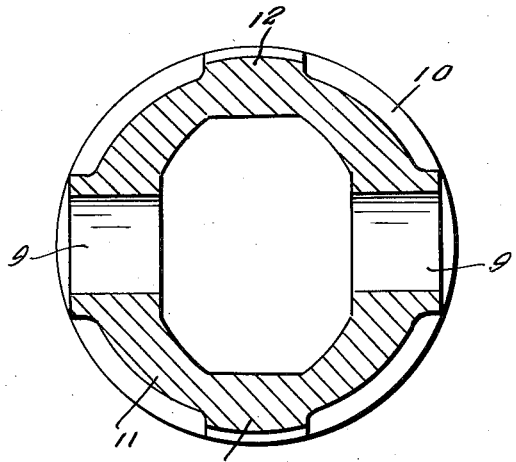
Figure 4 is a horizontal sectional view, taken substantially on the line 4—4 of Figure 3.
Figure 5 is a fragmentary view in vertical section, taken substantially on the line 5—5 of Figure 1.

Depending from the head 1 is a tubular strut 5 of comparatively small diameter which is provided with vertical reinforcing ribs 6. Strengthening webs 7 are provided between the bottom of the head 1 and the upper portion of the strut 5. As shown to advantage in Figure 3 of the drawings, the reinforcing rib 4 includes depending end portions 8 which are integral with the tubular strut 5.

Formed integrally with the lower end of the strut 5 are aligned bearings 9 for the reception of the usual wrist pin (not shown). Mounted above and below the wrist pin bearings 9 are rings 10 which provide bearing surfaces which are engageable with the walls of the engine cylinder. An annulus 11 of comparatively small diameter is provided between the rings 10 and 11, said annulus being spaced from the cylinder wall as will be readily apparent. Arms 12 and 13 support the rings 10 on the annulus 11 and on the wrist pin bearings 9, respectively, thus leaving openings 14. The arms 13 have formed thereon reinforcing ribs 15.

In use, the spaced upper and lower rings 10 engage the walls of the cylinder and effectively prevent "slapping", the upper end or head of the piston being supported in the cylinder by the rings. By reason of the fact that the lower or skirt portion of the piston is spaced from the head thereof it has been found that "oil pumping" is substantially eliminated. Further, the transmission of heat from the head 1 to the lower or skirt portion of the piston, to which the connecting rod is coupled is materially reduced. Lubricating oil which is scraped from the cylinder walls by the rings may return freely to the crankcase of the engine through the openings 14.

It is believed the that the many advantages of a piston constructed in accordance with the present invention will be readily understood, and although a preferred embodiment of the invention is as illustrated and described, it is to be understood that changes in the details of construction and in the combination and arrangement of parts may be resorted to which will fall within the scope of the invention as claimed.

What is claimed is:—

A piston of the class described comprising a head having a plurality of spaced annular grooves therein for the reception of rings, the lowermost grooves having spaced drain ports therein, a tubular strut depending from said head and being of a diameter smaller than the diameter of the head, integral oppositely disposed vertically extending ribs on the outer side of said strut, aligned wrist pins bearing on the lower portion of said strut, an annulus supported on the lower portion of said strut, bearing rings disposed above and below the annulus, said bearing rings being of a diameter greater than the diameter of the annulus and the uppermost bearing ring encircling the strut and being spaced therefrom in concentric relation thereto, spaced connecting arms extending between the annulus and the bearing rings and connecting arms extending between the wrist pin bearing and the bearing ring.

JULIUS LESLIE WELCH.